United States Patent [19]
D'Onofrio

[11] 3,777,343
[45] Dec. 11, 1973

[54] METHOD FOR FORMING A HELICALLY CORRUGATED CONCENTRIC TUBING UNIT

[75] Inventor: Mario L. D'Onofrio, Hartford, Conn.

[73] Assignee: Spiral Tubing Corporation, New Britain, Conn.

[22] Filed: Feb. 28, 1973

[21] Appl. No.: 336,794

Related U.S. Application Data

[62] Division of Ser. No. 123,150, March 11, 1971, Pat. No. 3,730,229.

[52] U.S. Cl. 29/157.3 R, 29/157.3 AH, 113/118 R, 113/118 A
[51] Int. Cl. B21d 53/02, B23p 15/26
[58] Field of Search ............ 29/157.3 A, 157.3 AH, 29/423, 157.3 R; 113/118 A, 118 R; 138/38, 114, 148; 165/156, 184

[56] References Cited
UNITED STATES PATENTS

| | | | |
|---|---|---|---|
| 1,564,446 | 12/1925 | Rhoads | 29/157.3 AH |
| 1,761,981 | 6/1930 | Bundy | 113/118 A |
| 1,797,014 | 3/1931 | Nichols | 138/38 X |
| 2,913,009 | 11/1959 | Kuthe | 138/38 |
| 2,993,682 | 7/1961 | Huet | 138/38 X |
| 3,328,868 | 7/1967 | Eckhardt | 29/157.3 A |

FOREIGN PATENTS OR APPLICATIONS

| | | | |
|---|---|---|---|
| 156,821 | 12/1904 | Germany | 138/38 |

Primary Examiner—Charles W. Lanham
Assistant Examiner—D. C. Reiley, III
Attorney—Donald K. Huber

[57] ABSTRACT

A tubing unit useful, for example, as part of a heat exchanger includes a first tube containing a second helically corrugated tube having on its outer surface helical ridges which engage the inner wall of the first tube to mechanically lock the two tubes in assembly and to form one or more helical passageways between the first and second tubes. The first tube may be of a substantially straight cylindrical shape or may include helical grooves on its inner surface for receiving and mating with the radial outer end portions of the helical ridges on the outer surface of the second tube. A third tube may surround the first tube and include helical corrugations with inwardly extending ridges engaging the outer surface of the first tube to form another set of helical passageways between the first tube and the third tube. In the making of the tubing unit, the second tube is assembled over a mandrel and within the first tube and then twisted to form the helical corrugations therein, the mandrel limiting the inward growth of the inwardly extending ridges and the first tube limiting the outward growth of the outwardly extending ridges. In cases where a third tube is used, such third tube is placed over the second tube and twisted to form helical corrugations therein, the outer surface of the first tube limiting the radial inward growth of the inwardly extending ridges thereof.

4 Claims, 9 Drawing Figures

PATENTED DEC 11 1973 3,777,343

METHOD FOR FORMING A HELICALLY CORRUGATED CONCENTRIC TUBING UNIT

CROSS-REFERENCE TO RELATED APPLICATION

This application is a division of pending application Ser. No. 123,150, filed Mar. 11, 1971, now U.S. Pat. No. 3,730,229.

BACKGROUND OF THE INVENTION

This invention relates to a method for making a tubing unit comprised of two or more generally concentric tubes at least one of which is twisted to form helical corrugations therein and to define as a result of such corrugations a set of helical passageways between two of the tubes for the flow of a fluid therethrough.

In a tubing unit made in accordance with the method of this invention, the inner one of two concentric tubes is corrugated and includes radially outwardly extending ridges which engage the inner surface of the outer tube to mechanically lock the two tubes to one another. This has the beneficial effect of not only forming a set of helical passageways between the first and second tubes but of also forming helical ridges and grooves on the inner surface of the inner tube so that the passageway through the center of the inner tube is one promoting turbulence of the fluid passing therethrough. It also causes both the inner and outer surfaces of the inner tube to be of large area enhancing the transfer of heat through the wall of the inner tube and between the fluid flowing through the center of the inner tube and the fluid flowing through the helical passageways formed between the inner tube and the outer tube.

In making the tubing unit of this invention, a mandrel is inserted in the inner tube before such tube is twisted so as to restrict the radial inward growth of the radially inwardly extending ridges thereof. By properly selecting the diameters and thicknesses of the tubes and the diameter of the mandrel, the shape of the helical corrugations formed in the inner tube may be relatively precisely controlled and, when desired, the grooves in the outer surface of the inner tube may be made to have substantially flat bottoms of considerable axial length so as to cause the helical passageways formed between the inner and outer tubes to have relatively large cross-sectional areas capable of handling relatively high flow rates with minimal pressure drop.

When desired, a third tube may be utilized in the present invention, such third tube surrounding the outer tube of the basic two-tube unit and being twisted to form helical corrugations which include ridges extending radially inwardly thereof and engaging the outer surface of the outer tube of the basic unit, thereby providing a unit having two different sets of helical passageways as well as the helical passageway extending through the center of the innermost tube.

It is well known at the present time to form helically corrugated tubing by twisting a thin-walled metallic tube of initial generally right-cylindrical shape. Techniques for doing this are disclosed in reissued U.S. Pat. Nos. 24,783, 3,015,355 and 3,533,267, to which reference may be made for further details.

SUMMARY OF THE INVENTION

The invention resides in a method for making a tubing unit comprised of at least two concentric tubes. In this method, two tubes of substantially different diameters and having initially substantially constant cross-sectional size and shape along their length are assembled with the smaller one inside of the larger one and with a mandrel received inside of the smaller one. The inner one of the two tubes is then twisted by applying a twisting torque at two points along its length to form helical corrugations therein defining radially outwardly extending helical ridges on its outer surface and radially inwardly extending helical ridges on its inner surface, the radial outward growth of the outwardly extending ridges during the twisting process being limited by engagement of such ridges with the inner surface of the larger tube and with the radial inward growth of the radially inwardly extending ridges of the inner tube being limited by engagement thereof with the outer surface of the mandrel.

DETAILED DESCRIPTION OF THE PREFERRED EMBODIMENTS

Figure 1:
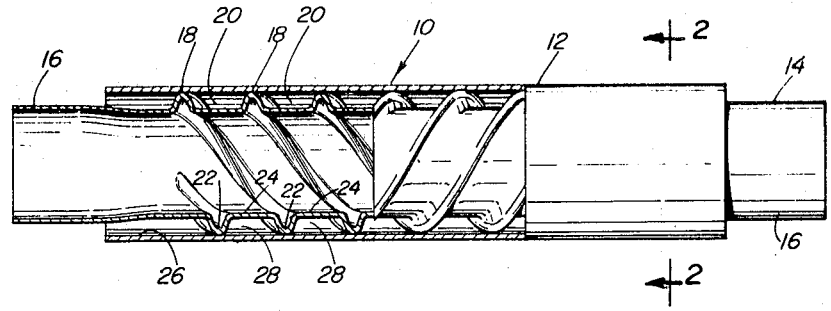
FIG. 1 is a view partly in elevation and partly in longitudinal section taken through a tubing unit made in accordance with the method of the present invention.

In the drawings, FIGS. 1 to 4 show various different tubing units made in accordance with the general method of this invention, and FIGS. 5 to 9 relate to the method itself. As hereinafter discussed in connection with FIGS. 1 to 4, a tubing unit embodying this invention may consist of two or more concentric tubes at least one of which is helically corrugated. Each of these tubes is preferably metallic, and various different metals may be used in the tubing unit depending on the nature of the fluid to be handled thereby, its temperature, and various other considerations. Most commonly, the tubes may be made of copper, aluminum or stainless steel, but of course the invention is not limited to these particular metals. It should also be understood that FIGS. 1 to 4 show basic tubing units prior to the application thereto of various fittings for introducing fluids to the various passageways involved, or before incorporation into a larger device such as a heat exchanger containing many interconnected tubing units. The fittings applied to the tubing units and/or the manner in which tubing units are connected to other similar units or other piping in a more complex device may take various different forms obvious to persons skilled in the art and form no part of the present invention.

Referring first to FIG. 1, this figure shows a tubing unit indicated generally at 10 and comprising a first tube 12 and a second tube 14. The tube 12 is of substantially right-cylindrical shape so as to have a substantially constant cross-sectional size and shape along its entire length. The second tube 14 has two end portions 16, 16 both of which extend beyond the adjacent ends of the first tube 12 and both of which end portions 16, 16 are of substantially constant cross-sectional size and shape along their lengths. Between the two end portions 16, 16, and within the tube 12, the tube 14 includes a helically corrugated portion defining on the outer surface of the tube 14 a plurality of radially outwardly extending helical ridges 18, 18 and a plurality of helical grooves 20, 20. Complementary with the ridges and grooves on its outer surface, the tube 14 on its inner surface includes a plurality of helical grooves 22, 22 and a plurality of radially inwardly extending helical ridges 24, 24. The radially outwardly extending helical ridges 18, 18 on the outer surface of the tube 14 tightly engage the inner surface 26 of the tube 12 and thereby mechanically lock the two tubes 12 and 14 in place relative to one another. Additionally, the engagement of the ridges 18, 18 with the inner surface of the tube 12 causes a plurality of helical passageways 28, 28 to be formed between the two tubes 12 and 14. Thus, when a fluid is introduced to one end of the tube 12, it is, in flowing toward the other end, constrained to flow through the helical passageways and is thereby turbulated and brought into good heat exchange relationship to the outer surface of the tube 14.

The number of helical passageways formed between the two tubes may vary depending on the number of separate continuous helical ridges 18, 18 formed in the tube 14. Most commonly, however, the tube 14 is formed to include two, three or four such continuous ridges extending along its length to form respectively two, three or four helical passageways between the two tubes. As shown best in FIG. 2, the tubing unit of FIG. 1 includes three continuous ridges 18, 18 and, therefore, defines three helical passageways 28, 28 between the two tubes.

The shape of the passageways 28, 28 may be varied by varying the shape of the grooves 20, 20 in the tube 14, and preferably the grooves 20, 20 are of such a shape as to have substantially flat bottoms of substantial axial length as shown in FIG. 1. Still more preferably, the length of each flat bottom of each groove 24 is substantially greater in longitudinal cross-section than the length of the ridge 18 located between each pair of flat bottoms. This makes each passageway 28 of a substantial size enabling the passage therethrough of a fluid at a substantial volumetric rate with minimum pressure drop.

Figure 3:
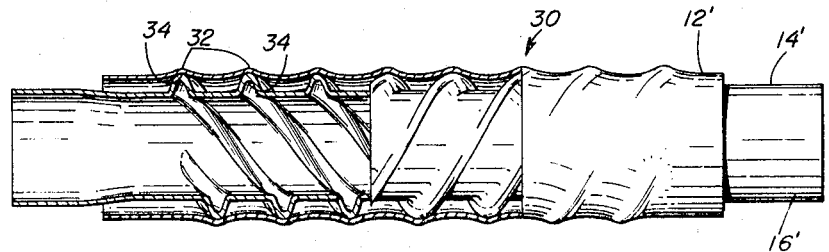
FIG. 3 is a view partly in elevation and partly in longitudinal section taken through a tubing unit made in accordance with another embodiment of the method of this invention.

In the tubing unit 10 of FIG. 1, the first tube 12 has a substantially right-cylindrical shape and, if deformed at all, is deformed to only a slight degree from such right-cylindrical shape. Such unit is often acceptable in cases where, for example, heat transfer is desired only between a fluid flowing through the helical passageways 28, 28 and another fluid flowing through the center of the tube 14. In other cases, however, heat transfer may also be desired between the fluid flowing through the helical passageways 28, 28 and another fluid flowing past the outer surface of the outer tube 12. In such a case, it may be desirable to also deform the outer tube 12 so as to provide it with a larger heat transfer surface and to make such surface of an irregular shape promoting turbulence. Such a tubing unit is shown in FIG. 3 and indicated generally at 30. Except for the outer tube of the tubing unit 30 being of a corrugated shape, the parts of the unit 30 are similar to the corresponding parts of the unit 10 of FIG. 1, and in FIG. 3 have been given the same reference numerals as in FIG. 1 except for being primed.

In referring to FIG. 3, it should be noted that the outer tube 12' includes radially outwardly extending helical ridges 32, 32 on its outer surface and corresponding radially outwardly extending helical grooves 34, 34 on its inner surface, the grooves 34, 34 receiving and mating with the outer portions of the helical ridges 18', 18' on the outer surface of the inner tube 14'. The mating relationship between the ridges 18', 18' and the grooves 34, 34 thereby serve to provide a still more secure grip between the two tubes for locking the two tubes to one another. Actually, as will be evident hereinafter, the helical ridges 32, 32 and grooves 34, 34 of the tube 12' are formed by the ridges 18', 18' of the tube 14' as the tube 14' is twisted to form the corrugations therein during the manufacturing of the unit 30. By properly selecting the relative wall thicknesses of the two tubes and the relative diameters of the two tubes and of the mandrel, the outer tube may be controllably deformed to various different degrees as desired.

Figure 4:
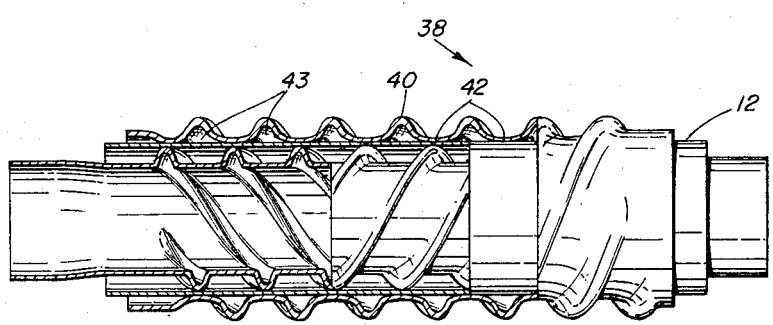
FIG. 4 is a view partly in elevation and partly in longitudinal section showing a tubing unit made in accordance with still another embodiment of the method of this invention.
Figure 2:
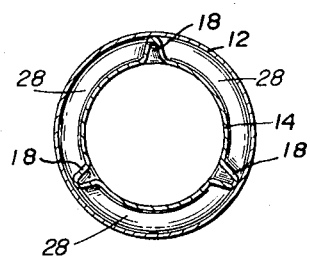
FIG. 2 is a transverse cross-sectional view taken on the line 2—2 of FIG. 1.

FIG. 4 shows a tubing unit indicated generally at 38 which is similar to the tubing unit 10 in FIG. 1 except for including a third tube 40 which surrounds the tube 12 of FIG. 1. The tube 40 is corrugated and on its inner surface it includes radially inwardly extending ridges 42, 42 which engage the outer surface of the tube 12 to mechanically lock the tube 40 to the tube 12 and to form a plurality of helical passageways 43, 43 between the tube 12 and the tube 40. Therefore, in the case of the tubing unit 38, a first fluid may be passed through the center of the inner tube 14, another fluid may be passed through the helical passageways between the two tubes 12 and 14, another fluid may be passed through the helical passageways between the tubes 40 and 12, and still another fluid may be passed past the outer surface of the outer tube 40. Of course, in a device utilizing the unit 38, two or more of the various different flow paths through or past the unit may be connected in common to handle a common fluid, if desired.

Figure 5:
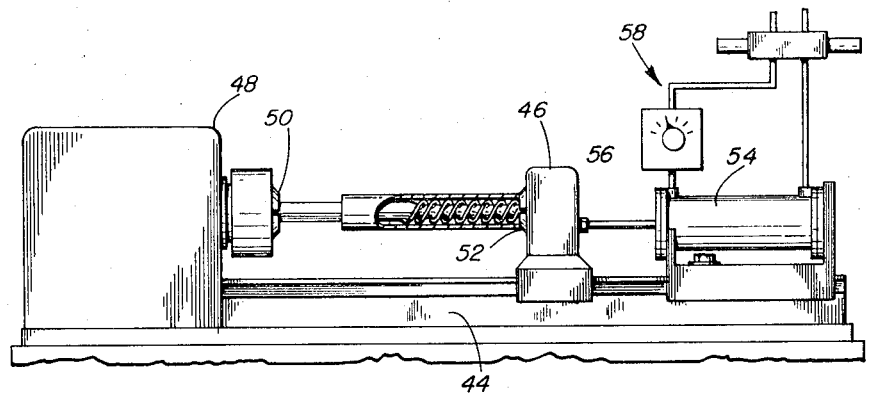
FIG. 5 is an elevational view showing one form of apparatus for making a tubing unit in accordance with the method of this invention.

Turning now to FIG. 5, this figure shows one form of an apparatus which may be used to make a tubing unit embodying this invention. As shown, this apparatus is or may be generally similar to that illustrated and described in detail in the aforementioned patents to which reference is made for a more complete understanding of its structure. For the present purposes, it is sufficient to note that the apparatus includes a bed 44 and a tailstock 46 mounted for sliding movement longitudinally of the bed. A fixed headstock 48 includes a powered rotatable chuck 50 which cooperates with another non-rotatable chuck 52 carried by the tailstock.

Attached to the bed 44 is a hydraulic cylinder 54 having a rod 56 connected to the tailstock 46 for moving the tailstock toward and away from the headstock 48. During a twisting operation the cylinder 54 drives the tailstock 46 toward the headstock to control the formation of the corrugations in the tube being twisted. Suitable hydraulic controls, not forming a part of this invention, are provided for doing this, a portion of such controls being indicated at 58 in FIG. 5.

Figure 6:
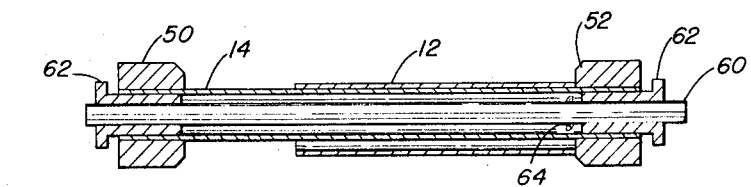
FIG. 6 is a longitudinal sectional view showing the manner in which the two tubes and the mandrel are assembled relative to one another prior to the twisting operation.
Figure 7:
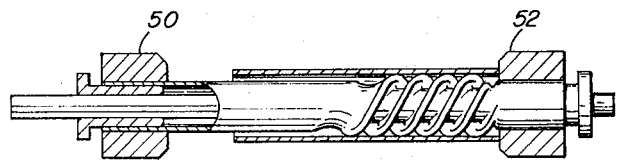
FIG. 7 is a view similar to FIG. 6 but shows the tubes and mandrel in the relative positions occupied at one instant during the progress of the twisting operation.

FIG. 6 shows the manner in which two tubes and a mandrel are assembled relative to one another in the device of FIG. 5 prior to the corrugating operation to form a tubing unit such as the unit 10 of FIG. 1. Referring to this figure, the inner tube 14 in its initial undeformed state is placed in the two chucks 50 and 52 which grip the tube at its opposite ends. A mandrel 60 having an outer diameter substantially less than the inside diameter of the undeformed tube 14 is inserted in the tube 14 and is preferably held in a centered position relative to the tube by two centering sleeves 62, 62, the mandrel being longitudinally slidable relative to at least the left-hand sleeve 62. The centering sleeves 62, 62 are not, however, absolutely essential since as the twisting operation takes place the corrugations formed in the tube 14 and engaging the mandrel will have a generally self-centering influence on the mandrel. Therefore, in some cases, if desired, the mandrel may merely be laid loosely inside the tube 14 prior to the start of the twisting operation. The outer tube 12 is placed over the tube 14 and positioned close to the one of the two chucks from which the corrugations are to start during the twisting operation, this being the right-hand chuck in FIG. 5. The tube 12, if desired, may be held by some centering means in a centered condition relative to the tube 14 prior to the start of the twisting operation, but this is not necessary since as the corrugations are formed in the tube 14 their engagement with the inner surface of the tube 12 will exert a self-centering influence on the tube 12.

Figure 8:
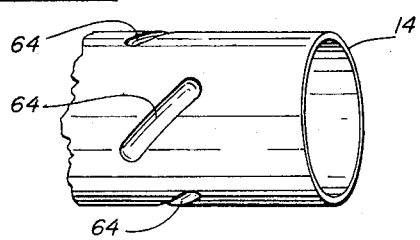
FIG. 8 is an enlarged perspective end view of the inner tube of FIG. 6 showing the indentations formed therein prior to the twisting operation.

It should also be noted that, prior to the twisting operation, the tube to be twisted preferably has formed therein, adjacent one of its ends, a number of indentations which serve as starts for the grooves formed in the outer surface of the tube during the twisting. The number of such indentations provided controls the number of continuous grooves formed in the tube during the twisting, and preferably each indentation is elongated and oriented so as to follow substantially the later-formed groove started therefrom. FIG. 8, at 64, 64, shows several such indentations formed in the tube 14.

After the tubes and mandrel are assembled with the chucks 50 and 52 as shown in FIG. 5, the chuck 50 is rotated relative to the stationary chuck 52 to twist the tube 14, and as this twisting takes place, the tube deforms into a helical shape, the helical ridges and grooves so-formed progressing steadily from the starting indentations 64, 64 toward the chuck 50 as the chuck 50 rotates. This deformation of the tube 14 includes both an outward growth of the helical ridges 18, 18 on the outer surface of the tube 14 and an inward growth of the ridges 24, 24 on the inner surface of the tube. The radial outward growth of the outwardly extending ridges 18, 18 is limited by engagement of such ridges with the inner surface of the outer tube 12 and the radial inward growth of the inwardly extending ridges 24, 24 is limited by engagement of the same with the outer surface of the mandrel 60, and by properly selecting the outer diameter of the mandrel, the length of the flat bottomed grooves 20, 20 may be controlled.

After the twisting operation is completed, and as a result of such twisting, the outer tube 20 is firmly locked in place relative to the inner tube 40 as a result of the tight engagement between the ridges 18, 18 of the inner tube and the inner surface of the outer tube. Also, the mandrel is tightly gripped by the inwardly extending ridges 24, 24 of the inner tube. Preferably, before the mandrel and tubing unit are removed from the twisting apparatus, this grip on the mandrel is relieved by slightly reverse twisting the tube 14 by rotating the rotatable chuck 50 a slight distance in the reverse direction. This, therefore, loosens the mandrel and allows it to be more easily slid from the tubing unit after removal from the chucks 50 and 52.

Figure 9:
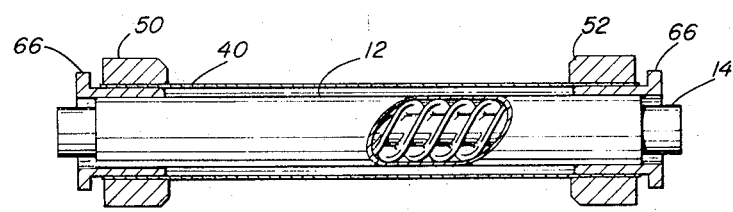
FIG. 9 is a view similar to FIG. 6 but showing tubes as arranged prior to the initiation of the twisting of a third tube onto the outer surface of the larger tube of FIG. 6 to make a three-tube unit.

To make a three-tube tubing unit, such as unit 38 of FIG. 4, the outer tube 40 is corrugated and assembled with the tube 12 by twisting the outer tube 40 and using the tube 12 generally as a mandrel. This corrugating of the outer tube 40 and its contemporaneous assembly with the tube 12 may be performed either before or after the inner tube 14 is corrugated and assembled with the tube 12, but preferably, the outer tube 40 is twisted after the twisting of the inner tube 14. FIG. 9, by way of example, shows an outer tube 40 in its initially undeformed state assembled with a tube 12 already containing and assembled with a corrugated inner tube 14. The tube 40 is held in the chucks 50 and 52 and the tube 14 is placed within the tube 40 and held in a centered relationship therewith by two centering sleeves 66, 66. Appropriate starting indentations are formed in one end of the tube 40 and then the chuck 50 is rotated relative to the chuck 52 to corrugate the tube 40 and thereby assemble it with the tube 12 to form the complete unit 38 of FIG. 4.

I claim:

1. The method of making a tubing unit which method comprises the steps of: providing a first tube, providing a second tube having an outside diameter substantially less than the inside diameter of said first tube, providing a mandrel having an outside diameter substantially smaller than the inside diameter of said second tube, assembling said first and second tubes and said mandrel with said mandrel inside of said second tube and with said second tube inside of said first tube, thereafter twisting said second tube by applying a twisting torque at two separate points along its length to form helical corrugations therein defining a first set of ridges on the outer surface of said second tube and a second set of ridges on the inner surface of said second tube, the radial outward growth of said first set of ridges during said twisting step being limited by engagement thereof with the inner surface of said first tube, and the radial inward growth of said second set of ridges during said twisting step being limited by engagement thereof with the outer surface of said mandrel, and subsequently removing said mandrel from said second tube.

2. The method defined in claim 1 further characterized by forming a plurality of circumferentially spaced indentations in said second tube in a zone spaced from one end of said second tube with all of said indentations having substantially the same spacing from said tube end, said step of forming said indentations being performed prior to the twisting of said second tube so that said indentations serve as starting points for helical grooves formed in the outer surface of said second tube during said twisting operation.

3. The method defined in claim 1 further characterized by reverse twisting said second tube following said twisting operation to relieve said second tube from tight engagement with said mandrel.

4. The method defined in claim 1 further characterized by providing a third tube having an inside diameter longer than the outside diameter of said first tube, placing said first tube within said third tube, and twisting said third tube by applying a twisting torque at two points along its length to form helical corrugations therein defining a set of helical ridges on its inner surface, the radial inward growth of said latter set of ridges during said latter twisting step being limited by engagement thereof with the outer surface of said first tube.

* * * * *